Figure 1:
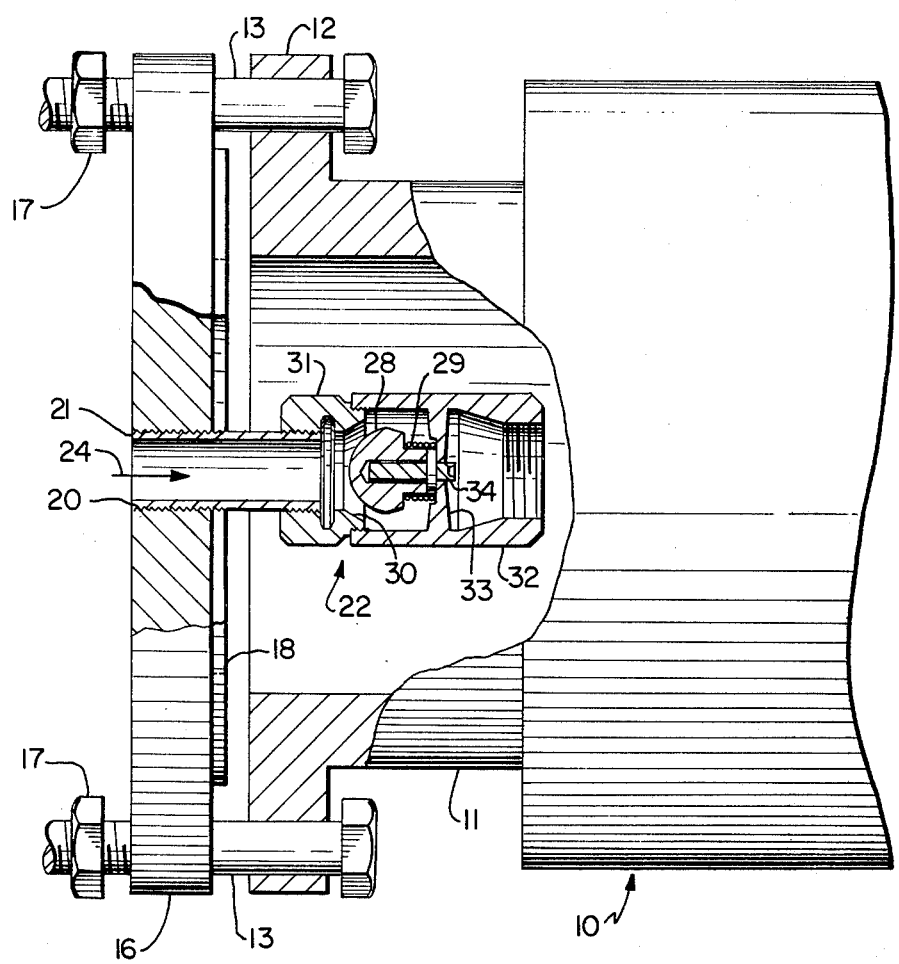

United States Patent [19]

Spring

[11] 4,332,276
[45] Jun. 1, 1982

[54] FUEL HOSE DRAINAGE APPARATUS

[76] Inventor: Donald H. Spring, One Fathom La., Wareham, Mass. 02571

[21] Appl. No.: 204,547

[22] Filed: Nov. 6, 1980

[51] Int. Cl.³ .............................................. F16L 55/10
[52] U.S. Cl. .................................... 137/526; 137/583; 138/89; 222/424; 222/562; 251/147
[58] Field of Search ............... 137/302, 526, 583, 589; 138/89, 96 R, 96 T, 32; 222/424, 546, 562, 478, 481; 251/147

[56] References Cited

U.S. PATENT DOCUMENTS

| | | | |
|---|---|---|---|
| 685,169 | 10/1901 | Paul | 137/583 |
| 1,336,026 | 4/1920 | Dempsey | 137/583 X |
| 1,525,861 | 2/1925 | Franklin | 137/526 |
| 3,145,724 | 8/1964 | Pelzer | 137/526 X |
| 3,605,132 | 9/1971 | Lineback | 137/526 X |
| 3,845,779 | 11/1974 | Greene | 138/32 X |
| 4,172,465 | 10/1979 | Dashner | 137/543.15 X |

Primary Examiner—Robert G. Nilson
Attorney, Agent, or Firm—Roylance, Abrams, Berdo & Farley

[57] ABSTRACT

A venting valve for a cargo hose includes a cover plate attachable to the hose, the plate having an opening which receives a coupling to a check valve. The check valve prevents escape of fuel but admits air to permit fuel to drain from the hose into an attached storage tank, preventing spillage when the hose is subsequently detached therefrom and handled.

4 Claims, 2 Drawing Figures

FUEL HOSE DRAINAGE APPARATUS

This invention relates to an apparatus for permitting and controlling the drainage of fuel delivery hoses to prevent fuel waste and ecological damage.

BACKGROUND OF THE INVENTION

Various types of fuels, but most notably fuel oils, are frequently transferred from one marine vessel to another, as well as between floating vessels and shore installations. The transfer is accomplished in most, if not all, cases using cargo hose which has an inner diameter of several inches (various sizes being used for different circumstances) and can accomodate quite high flow rates to thereby keep the fuel transfer time to a minimum. The hose can, and often is, supplied in sections, each of which can be 25 or more feet long, and the sections can be coupled together to form a hose having the needed length.

As will be recognized, with a hose several inches in diameter and twenty or more feet long, a sizable quantity of fuel can exist in the hose itself at any time. After transfer of fuel to or from a tank vessel, it is common practice to attach a closure to the output end of the hose, this closure being a metal disc, called a blank, having holes so that it can be bolted to a fitting on the hose end. Attachment of the blank prevents fuel contained in the hose from spilling out at that time, but ultimately it is necessary to remove the blank and, unless that is done very carefully, fuel is spilled.

Simple calculation shows that an 8" ID hose section 25 feet long can contain over 65 gallons of oil. Thus, the quantity involved in accidentally dumping a hoseful of oil is by no means trivial, and spills such as that can have a serious detrimental ecological effect as well as being wasteful of this increasingly precious commodity.

BRIEF DESCRIPTION OF THE INVENTION

Accordingly, an object of the present invention is to provide an apparatus which can prevent fuel waste or spillage by draining fuel from a transfer hose in a controlled fashion, returning the fuel to the storage tanks.

A further object is to prevent creation of a vacuum within a transfer hose so that fuel can drain therefrom into a storage tank.

Briefly described, the invention includes an apparatus for use in combination with a fuel delivery hose of the type used in marine fuel transfer and including an elongated tubular hose body and a metal end fitting at one end of said body, the end fitting being adapted to receive a cover plate to close the hose end between deliveries of fuel therethrough, the apparatus comprising means defining an opening through said cover plate; a valve coupled to said opening on the inner surface of said cover plate, said valve including a housing having a fluid flow passage therethrough and having means defining a valve seat along said passage; a valve member; means carried by said housing for supporting said valve member for movement toward and away from said valve seat to respectively close and open said passage to fluid flow; and spring means for urging said valve member toward said valve seat, said valve member being movable away from said seat by air pressure outside of said hose which exceeds the pressure within said hose by a predeterminable amount, whereby said valve member normally remains closed to prevent the escape of fuel from said one end of said hose, and said valve member is openable in response to differential pressure across said valve between the inside and outside of said hose to allow air to enter and to allow fuel contained in said hose to drain therefrom.

Figure 2:
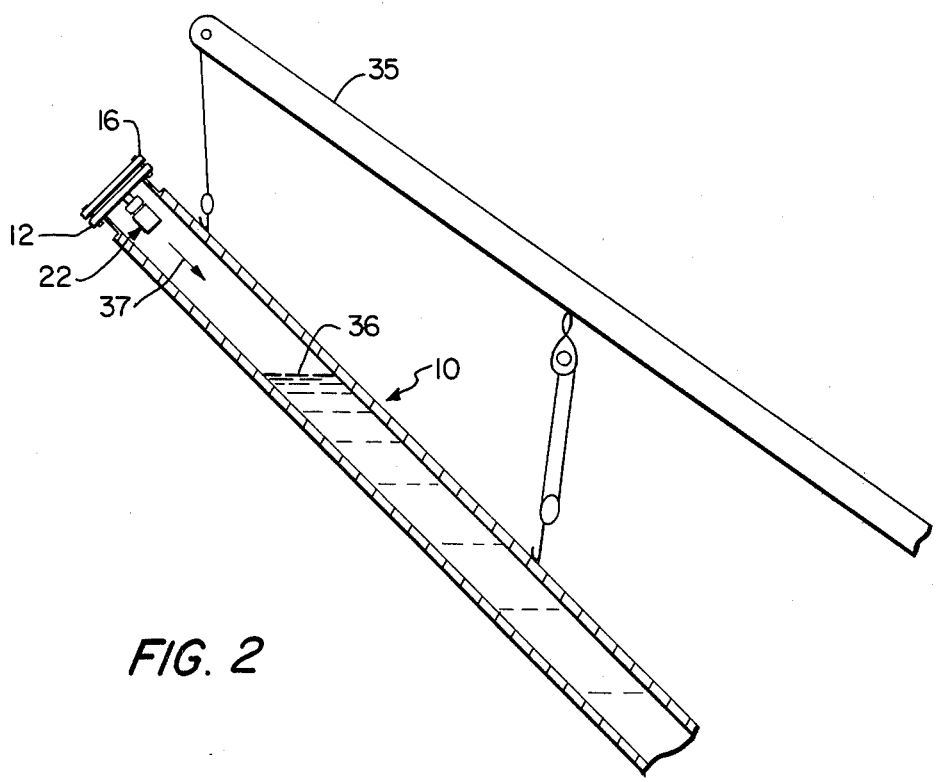

In order that the manner in which the foregoing and other objects are attained in accordance with the invention can be understood in detail, a particularly advantageous embodiment thereof will be described with reference to the accompanying drawings, which form a part of this specification, and wherein:

FIG. 1 is a side elevation, in partial section, of an end of a fuel delivery hose incorporating an apparatus in accordance with the present invention; and FIG. 2 is a side elevation, in partial section, showing the manner of handling a fuel hose with the apparatus of the present invention.

Referring now to the drawings in detail, FIG. 1 shows an end of a conventional fuel delivery hose, or cargo hose 10, which is provided with an end fitting 11 having a flange 12. Hose 10 is normally a stiff but somewhat flexible hose of an elastomeric material which is capable of withstanding attack by fuels and the like. This hose can be provided in a number of different diameters, depending upon the quantities of fuel and flow rates being handled, and the hose itself is normally reinforced. The fitting 11 at the end is metal. Flange 12 on fitting 11 is provided so that the end of the fuel hose can be attached to other fittings or valves on fuel tanks, and a fitting similar to fitting 11 is normally provided at the other end of the hose as well. As will be recognized, hose 10 is circular in cross section, as is fitting 11 and flange 12.

Flange 12 is provided with a plurality of circularly spaced openings, usually 8 in number, to receive fasteners such as bolts 13 for the purpose of attaching the flange to various devices and also for the purpose of applying a cover plate or blank to the fitting when the hose is being transported and handled during the connection and disconnection operations preliminary to and following fuel delivery. The cover plate is conventionally a relatively simple flat disk of non-ferrous material having an internal gasket, the cover plate being bolted on to prevent escape of fuel.

The apparatus in accordance with the invention employs a cover plate 16 which has been modified to receive a venting valve. As is conventional, plate 16 includes circularly spaced holes to match the holes in flange 12 so that bolts 13 can be passed therethrough and so that the plate can be fixedly attached to the end of the hose as by nuts 17. An annular gasket 18 which is commonly about ⅛ inch thick and is made of cork and neoprene, is cemented in place on the inner surface of plate 16.

In accordance with the invention, plate 16 is provided with a central opening 20 which is internally threaded to receive a short length of pipe 21 which is externally threaded, at least at its opposite ends, so that one end of pipe 21 can be threaded into the cover plate, staked therein if necessary, and so that it can receive a valve indicated generally at 22 on the other end thereof. Pipe 21 need only be in the order of two inches long and approximately one inch in diameter.

As illustrated, valve 22 is a conventional valve in the sense that the details thereof are known. It is extremely important, however, that valve 22 be a spring loaded valve operating to permit the passage of air, in one direction only, that direction being into the hose as illustrated by arrow 24. A valve usable for this purpose is shown in U.S. Pat. No. 4,172,465, Dashner, and is available from the assignee of that patent, Conbraco Industries, Inc., of Matthews, N.C.

As described in that patent, the valve functions as a check valve and includes a semi-spherical valve member 28 which is urged by a coil spring 29 toward a valve seat 30 having a frustoconical shape, the valve seat being formed on an interior surface of an inlet fitting 31 which is internally threaded to attach to the interior end of pipe 21. The valve housing 32 is formed with a narrow diametrically extending flange member 33 which extends across the interior of the housing and has a central opening to receive a guide stem 34 which extends axially into the valve member and acts as a guide for the axial movement of the valve member. Spring 29 operates between a shoulder on the valve member and flange member 33 to urge the valve member toward its closed position.

The valve member itself is preferably made of a material such as a fluorocarbon or other suitable plastic or elastomeric material, such as Teflon, so that it will not be degraded by exposure to fuels or fuel vapors, or other adverse ambient conditions. Can be made of non-ferrous metal also.

The operation of the apparatus, and the advantages of the invention, are best seen by reference to FIG. 2 which illustrates the situation of a fuel delivery hose being handled by an apparatus such as a boom 35 following fuel delivery. The end of the hose not illustrated is still connected to a tank to or from which fuel has been delivered, and the end including flange 12 has been connected to the point of fuel loading or discharging. At the conclusion of delivery, it is normally necessary that delivery be terminated while fuel still remains within the hose. After disconnection from the receiving tank, plate 16 with pipe 21 and valve 22 attached thereto, as illustrated in FIG. 1, is attached to flange 12 of the hose. Boom 35 is then employed to lift the hose and return it to the fuel delivery location, either a shore installation or a marine vessel.

So long as the end of the hose is lower than other portions thereof, permitting fuel to surround the area including valve 22, valve member 28 is firmly seated and the valve is closed. However, as soon as the hose is lifted so that flange 12 constitutes a high point in the hose, the fuel 36 remaining in the hose tends to move away from plate 12 and would normally be prevented from moving by a vacuum created in the end of the hose. However, with the venting valve installed, the differential pressure arising from this vacuum results in a considerably high pressure outside of the hose than inside, urging valve member 28 away from its seat, counter to the force exerted by spring 29. Thus, air is permitted to enter the end of the hose as illustrated by arrow 37 in FIG. 2 and arrow 24 in FIG. 1, allowing fuel 36 to flow freely and rapidly back to the storage tank from which it came. Thereafter, when hose sections are disconnected from each other, or disconnected from the storage tank, they are substantially empty of fuel and the waste and mess of fuel spillage, as well as ecological damage resulting from such spillage, does not occur.

While one advantageous embodiment has been chosen to illustrate the invention it will be understood by those skilled in the art that various changes and modifications can be made therein without departing from the scope of the invention as defined in the appended claims.

What is claimed is:

1. An apparatus for use in combination with a fuel delivery hose of the type used in marine fuel transfer, comprising
    a cover plate having means for securing said cover plate over a metal end fitting on one end of a marine fuel transfer hose to close the end fitting preventing flow of fuel therethrough and means defining an opening through said cover plate; and a valve coupled to said opening on the inner surface of said cover plate, said valve including
    a housing having a fluid flow passage therethrough and having means defining a valve seat along said passage,
    a valve member,
    means carried by said housing for supporting said valve member for movement toward and away from said valve seat to respectively close and open said passage to fluid flow, and
    spring means for urging said valve member toward said valve seat,
    said valve member being movable away from said seat by air pressure outside of said hose which exceeds the pressure within said hose by a predeterminable amount;
whereby said valve member normally remains closed to prevent the escape of fuel from said one end of said hose and said valve member is openable in response to differential pressure across said valve between the inside and outside of said hose to allow air to enter and to allow fuel contained in said hose to drain therefrom.

2. An apparatus according to claim 1 wherein said valve further includes a coupling pipe having one end threadedly engaging the opening in said cover plate and the other end threadedly engaging said housing.

3. An apparatus according to claim 2 wherein at least said cover plate, said coupling pipe and said valve housing are formed from non-ferrous material.

4. An apparatus according to claim 1 which further comprises, in combination, a marine fuel transfer hose having a metal end fitting on one end thereof, said cover plate being attached to and closing said end fitting to prevent flow of fuel out of said hose.

* * * * *